US008988387B2

(12) United States Patent
Gorsica et al.

(10) Patent No.: US 8,988,387 B2
(45) Date of Patent: Mar. 24, 2015

(54) TOUCH SENSOR PANEL WITH IN-PLANE BACKUP BYPASS CONNECTIONS

(75) Inventors: John J Gorsica, Round Lake, IL (US);
Dale F Bengtson, Crystal Lake, IL (US);
Michael F Olley, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 123 days.

(21) Appl. No.: 13/564,859

(22) Filed: Aug. 2, 2012

(65) Prior Publication Data

US 2014/0035833 A1 Feb. 6, 2014

(51) Int. Cl.
| G06F 3/044 | (2006.01) |
| G08C 21/00 | (2006.01) |
| G06F 3/041 | (2006.01) |
| G06F 3/045 | (2006.01) |
| H01H 11/00 | (2006.01) |
| H01H 13/702 | (2006.01) |

(52) U.S. Cl.
CPC ............... *G06F 3/041* (2013.01); *H01H 11/00* (2013.01); *H01H 13/702* (2013.01); *H01H 2203/014* (2013.01); *H01H 2205/016* (2013.01); *H01H 2239/056* (2013.01); *Y10T 29/49105* (2013.01)
USPC .......................... 345/174; 345/173; 178/18.06

(58) Field of Classification Search
USPC ...................... 345/173–178; 178/18.01–20.04
See application file for complete search history.

(56) References Cited

U.S. PATENT DOCUMENTS

| 8,704,779 | B2 | 4/2014 | Hristov et al. | |
| 2008/0218488 | A1* | 9/2008 | Yang et al. | 345/173 |
| 2009/0194344 | A1 | 8/2009 | Harley et al. | |
| 2010/0045614 | A1 | 2/2010 | Gray et al. | |
| 2010/0164889 | A1* | 7/2010 | Hristov et al. | 345/173 |
| 2010/0182272 | A1 | 7/2010 | Kang et al. | |
| 2010/0265205 | A1* | 10/2010 | Park et al. | 345/174 |
| 2010/0302201 | A1 | 12/2010 | Ritter et al. | |
| 2011/0018838 | A1* | 1/2011 | Lee | 345/174 |
| 2013/0063371 | A1* | 3/2013 | Lee et al. | 345/173 |

FOREIGN PATENT DOCUMENTS

| KR | 10-2010-0084254 | 7/2010 |
| KR | 10-2010-0115449 | 10/2010 |

OTHER PUBLICATIONS

Non-Final Office Action in corresponding Korean Application No. 10-2013-90312 mailed Sep. 4, 2014.

* cited by examiner

*Primary Examiner* — Ryan A Lubit
(74) *Attorney, Agent, or Firm* — Morris & Kamaly LLP

(57) ABSTRACT

Touch sensor panels (104) have 2-D periodic arrangements of electrodes (304) connected together forming a plurality of horizontal and vertical logical lines (506, 514) for measuring X-Y coordinates of a user's touch. Electrodes forming the horizontal logical lines are interleaved with electrodes forming the vertical logical lines. Each of the vertical and horizontal logical lines includes multiple tracks (502, 504, 510, 512). The tracks of each logical line are cross connected by in-plane cross connects (314, 318) formed in the same layer by the same process that is used to form the electrodes. Diamond and square electrode embodiments are described.

19 Claims, 11 Drawing Sheets

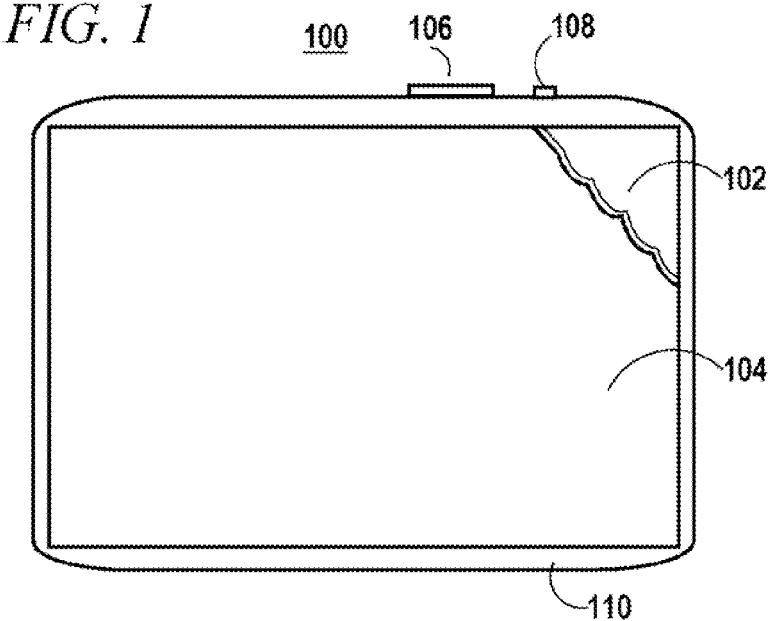
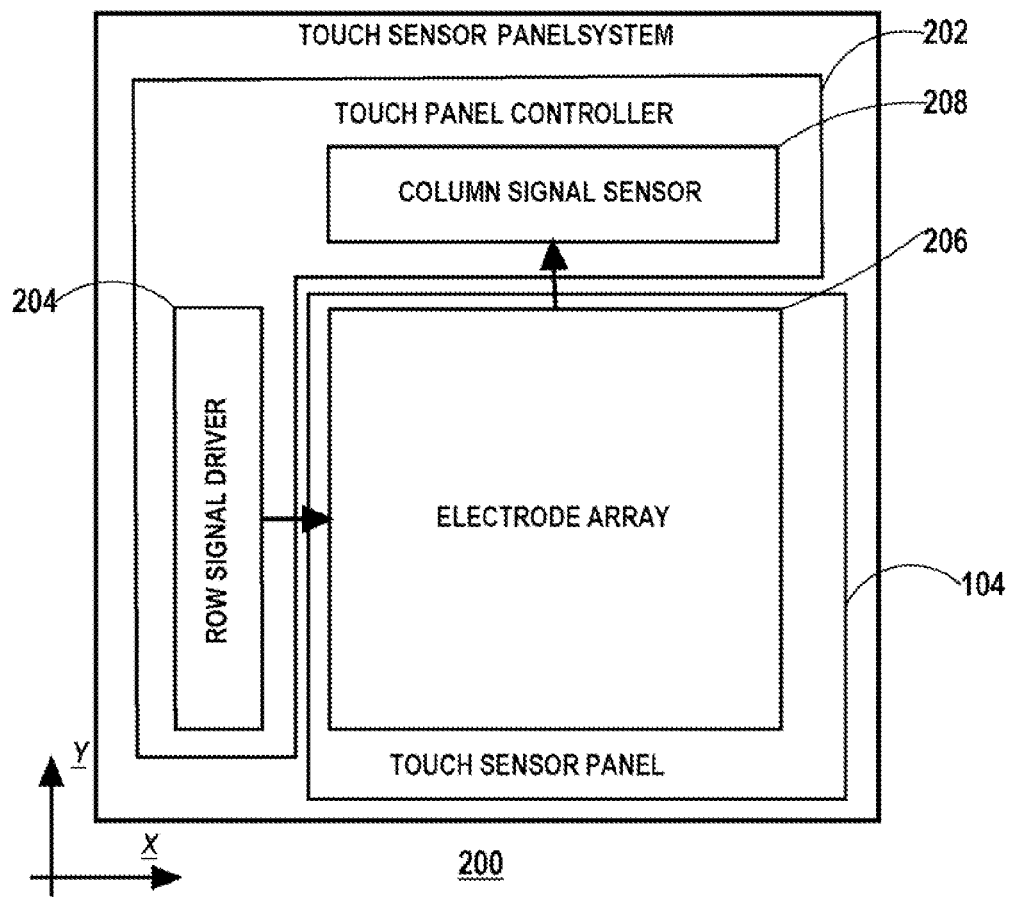

DOUBLE REDUNDANCY UNIT CELL

US 8,988,387 B2

TOUCH SENSOR PANEL WITH IN-PLANE BACKUP BYPASS CONNECTIONS

FIELD OF THE INVENTION

The present disclosure relates generally to touch sensors, more particularly to touch sensors for touch screens.

BACKGROUND

Touch screens have become a preferred user input device for smartphones and tablet computers. Touch screens use a transparent touch sensor panel overlying a display screen, e.g., a Liquid Crystal Display (LCD). Touch screens provide a more intuitive and natural way to interact with a Graphical User Interface (GUI) compared to traditional pointing devices such as mice or touch pads.

One form of touch screen has an array of diamond-shaped transparent, electrically-conductive areas formed on a transparent panel. (An alternative design uses square-shaped areas.) Half of the diamond shaped areas may be connected in horizontal rows and half connected together to form vertical columns. Electrical waveforms may be applied to the rows and sensed on the columns, or vice versa. The rows and columns may be scanned in a raster pattern in order to interrogate each X-Y position on the screen. If a user positions a finger tip at a certain position on the screen, the user's finger tip will alter the capacitive coupling between the row and column that cross at the position and when the aforementioned raster scanning addresses this position, the alteration of the capacitive coupling will be sensed by a change in the signal coupling from the row to the column or vice versa.

The diamond shaped areas are connected together by relatively narrow (compared to diamond width) traces so as to form rows and columns. The traces of the rows and the columns must not touch so as to avoid electrical short circuits. The traces of either the rows or the columns can be disposed in a common plane with the diamond shaped areas and formed in the same process used to form the diamond shaped areas; however, other traces which cross over those disposed in the common plane are formed in subsequent processes, i.e., by depositing an insulating material over the in-plane traces and subsequently forming conductive bridging traces from sputtered metal. The additional processes of depositing the insulating material and forming the bridging traces introduce new opportunities for defects to occur. Defects can also occur in the in-plane traces, which may result in portions of a row or column being electrically disconnected. Such defects tend to lower the yield of the touch sensor panel manufacturing process leading to decreased productivity and increased panel cost.

Accordingly it would be desirable to provide a touch sensor panel that is less prone to failure due to one or more connection failures.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 1 shows a sample touch screen device incorporating an embodiment of a touch sensor panel;

FIG. 2 is a block diagram of a touch sensor panel system used in the device shown in FIG. 1 according to an embodiment;

Figure 3:
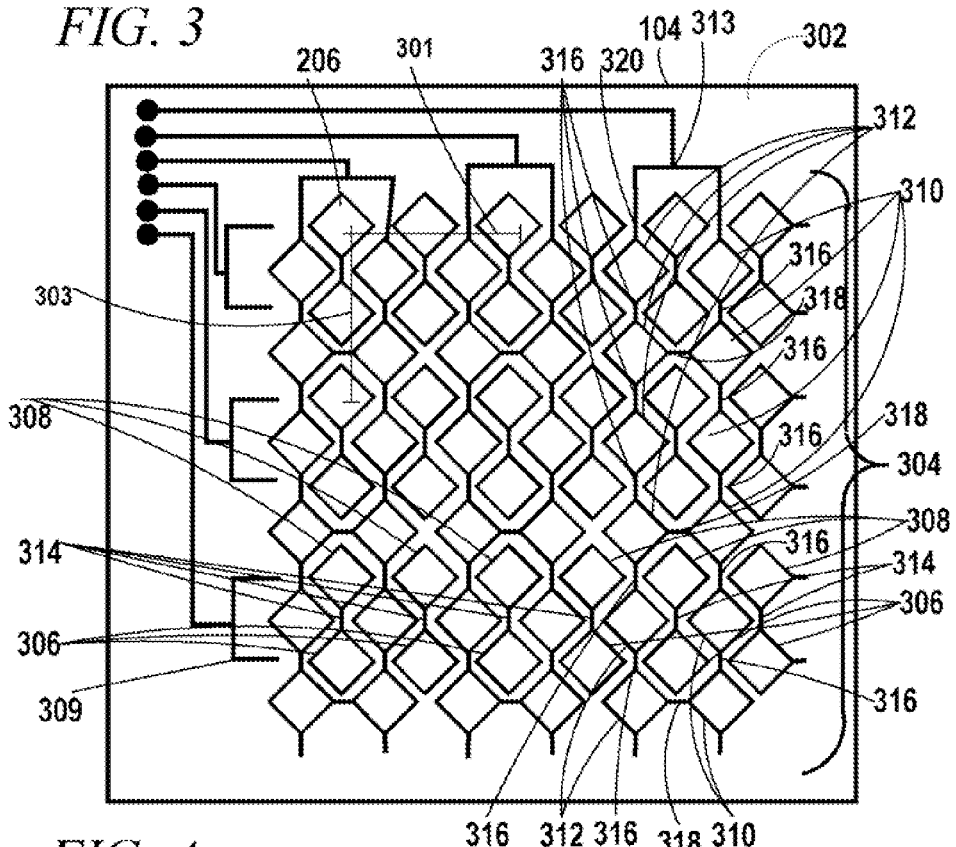
FIGS. 3-5 illustrate an electrode array of a touch sensor panel at a sequence of example stages in the course of manufacture according to an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the various embodiments.

DETAILED DESCRIPTION

Before describing in detail various embodiments of a touch sensor panel with in-plane backup bypass connections, it should be observed that the embodiments reside primarily in combinations of method steps and apparatus components related to touch sensor panels. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Touch sensor panels described herein include 2D transparent electrode arrays formed on substrates. These electrode arrays include first subsets of electrodes that form, at least, substantial parts of column logical lines and second subsets that form, at least, substantial parts of row logical lines. Each logical line includes multiple parallel tracks that are connected together at intervals by in-plane cross connects. Because the in-plane cross connects are formed from the same material (e.g., Indium Tin oxide) and in the same process as the electrode arrays, their structure and function tends to be reliable and they can be formed without incurring additional expense in the manufacturing process. The in-plane cross connects provide for backup bypass signal pathways through which signals can be routed in case there is an open circuit failure in one of the logical lines.

Because the column logical lines and row logical lines must cross, the touch sensor panel uses out-of-plane series connections in either the column logical lines or the row logical lines. These out-of-plane series connections are of a more complex structure and are formed by a more complex process compared to in-plane connections and are thus more susceptible to malfunction. The locations of the in-plane cross connects are strategically chosen to best mitigate against possible failures of the out-of-plane series connections. Providing the in-plane cross connects between tracks of logical lines mitigates against possible failures of the out-of-plane series connections.

FIG. 1 shows a touch screen device 100 incorporating an embodiment of a touch sensor panel. The touch screen device 100 can, by way of non-limiting example be a tablet computer, a smartphone, or a computer monitor. The touch screen device 100 includes a display 102 and a touch sensor panel 104 (shown partially cut away) overlying the display 102. A first physical button 106 and a second physical button 108 are provided for controlling the device 100, e.g., for turning the device 100 on and off and for adjusting the volume of audio produced by the device 100. Alternatively a different number and/or different types of physical buttons can be provided. The display 102, touch sensor panel 104, first physical button 106 and second physical button 108 are supported by a housing 110.

FIG. 2 is a block diagram of a touch sensor panel system 200 used in the device shown in FIG. 1 according to an embodiment. The touch panel system 200 includes a touch panel controller 202 that includes a row signal driver 204 electrically and drivingly coupled to logical row lines (see FIGS. 3-5) of an electrode array 206 of the touch sensor panel 104. Logical column lines (see FIGS. 3-5) of the electrode array 206 are electrically coupled to the column signal sensor 208. In operation the row signal driver 204 sequentially (e.g., in order from top to bottom, or otherwise) applies signals to logical row lines of the electrode array 206, and the column signal sensor 208 sequentially (e.g., in order from left to right, or otherwise) scans successive logical column lines of the electrode array 206. The relative rates at which successive rows and columns are scanned are suitably adjusted so as to read the electrode array 206 in a raster pattern. Alternatively, other scan patterns such as dynamically determined scan patterns can be used.

Selection of a combination of a particular logical row line and a particular logical column line selects a particular X-Y coordinate region on the touch sensor panel 104 for reading. When a user's finger is positioned proximate an X-Y coordinate region that is being read (selected), the user's finger will alter the capacitive coupling between the logical column line and logical row line that intersect at the selected X-Y coordinate region which will alter the strength of the signal that is coupled from the row signal driver 204 through the logical row line corresponding to the Y coordinate, through the logical column line corresponding to the X coordinate and into the column signal sensor 208. Alternatively, a driver may be coupled to the logical column lines of the electrode array 206 and a sensor may be coupled to the logical row lines of the electrode array 206. As shown the electrode array 206 is square. Alternatively the electrode array 206 can be rectangular or other shapes.

Figure 4:
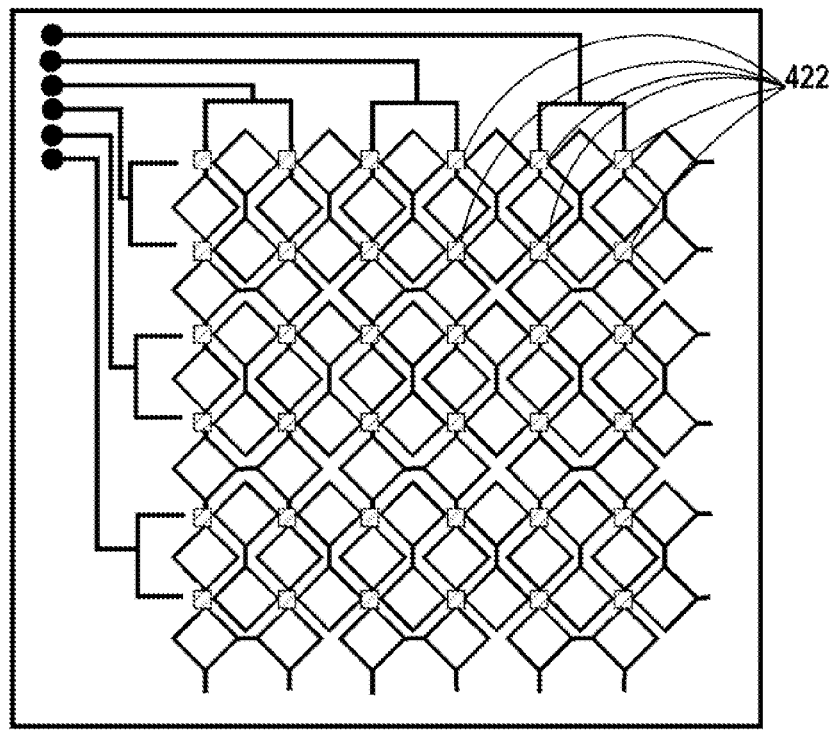
Figure 5:
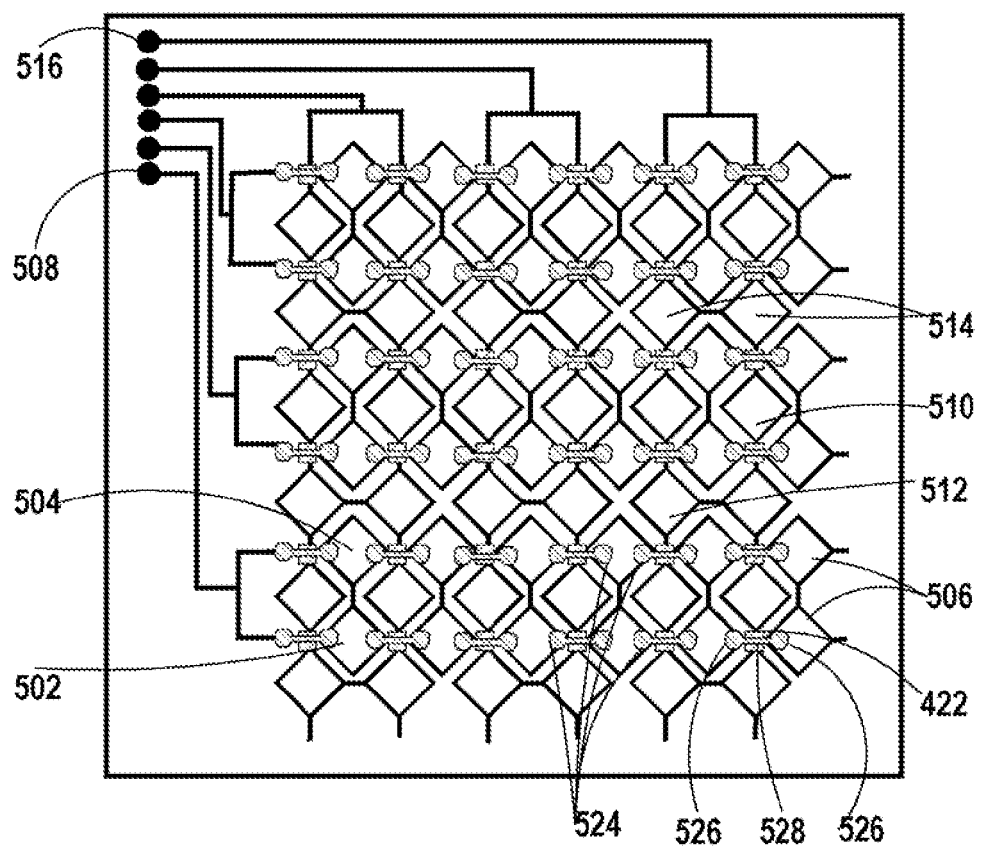

FIGS. 3-5 illustrate the electrode array 206 of the touch sensor panel 104 at a sequence of example stages in the course of manufacturing according to an embodiment. FIG. 3-5 shows the electrode array 206 support (substrate) 302 which may for example include glass, plastic, or other transparent material. The electrode array 206 includes a 2-D periodic array of diamond shaped areas 304 of transparent, electrically conductive material supported on the support 302. One suitable transparent, electrically conductive material is an Indium Tin Oxide (ITO) which can for example include from 70% to 97% $In_2O_3$ and from 3% to 30% $SnO_2$. Common formulations of ITO include 95% or 97% $In_2O_3$ and 3% or 5% SnO. Alternatively the transparent, electrically conductive material may by way of non-limitive example include: inorganic materials such as zinc oxide, fluorinated tin oxide ($SnO2$-F), carbon nanotubes, graphene, silver nanofibers and/or organic materials such as poly 3-4 ethylenedioxythiophone (PEDOT)/poly styrene sulfonate (PSS)/orgacon, polyacetylene, polyaniline, and polypyrrole.

An X direction translation symmetry period ΔX 301 and a Y direction translation symmetry period ΔY 303 are indicated in FIG. 3.

A first row of diamond shaped areas 306 are part of a first track 502 (FIG. 5) and a second row of diamond shaped areas 308 are part of a second track 504 (FIG. 5). Together the first track 502 and the second track 504 are two parallel tracks of a first logical row 506 (FIG. 5). In the embodiment shown in FIGS. 3-5 the first logical row 506 is first from the bottom of the drawing sheet. Alternatively there may be a higher number of parallel tracks per logical row and/or per logical column. All of the tracks in a logical row are connected in parallel. The same applies to all of the tracks in a logical column. All of the multiple (e.g., 2, 3, or 4) tracks in a logical row (or logical column) are connected to a single terminal. In the case of the first logical row 506, it is connected to a first terminal 508. The first track 502 and the second track 504 are connected together by a first branched feed trace 309 that also connects to the terminal 508 (FIG. 5). As shown in FIGS. 3-5 there are three logical rows, each of which includes two parallel tracks of diamond shaped areas of the array 304.

Also, as shown in FIGS. 3-5 there are three logical columns, each of which includes two parallel tracks. A first column of diamond shaped areas 310 are part of a third track 510 (FIG. 5) and a second column of diamond shaped areas 312 are part of a fourth track 512 (FIG. 5). Together the third track 510 and the fourth track 512, which is parallel to the third track 510, make up a first logical column 514 which is connected to a second terminal 516 (FIG. 5). The third track 510 and the fourth track 512 are connected together by a second branched feed (or sense) trace 313. All the terminals serving the logical rows and columns of the electrode array 206 are suitably grouped together as shown to facilitate connection to the touch panel controller 202. As shown, the diamond shaped areas that make up the columns and rows are interleaved in the aforementioned 2-D periodic pattern.

As shown in FIG. 3 the first row of diamond shaped areas 306 and the second row of diamond shaped areas 308 are not yet connected horizontally to form the first track 502 and the second track 504. However pairs of adjacent diamond shaped areas, with each pair including one of the first row of diamond shaped areas 306 and one of the second row of diamond shaped areas 308 are connected together vertically by a first set of in-plane cross connects (traces) 314 so that the first track 502 and the second track 504 will be connected together by the first set of in-plane cross connects.

As shown in FIG. 3 the first column of diamond shaped areas 310 and the second column of diamond shaped areas 312 are vertically connected by a set of in-plane series connections 316. Additionally, every other pair of horizontally adjacent diamond shaped areas including one from the first column of diamond shaped areas 310 and one from the second column of diamond shaped areas 312 are connected together horizontally by one of a second set of in-plane cross connects 318 so that the third track 510 and the fourth track 512 will be connected together by the second set of in-plane cross connects. The in-plane cross connects 314, 318 and the in-plane series connections 316 serve as conductive connections between the diamond shaped areas that they connect.

The second set of in-plane cross connects 318 are located between horizontally extending logical rows, and not between the tracks of any horizontally extending logical rows. Accordingly because there are two tracks per horizontally extending logical row, the second set of in-plane cross connects are located at every second position along the vertically extending logical columns (e.g., 514). More generally if there are N tracks per horizontally extending logical row, the second set of in-plane cross connects would be located at every $N^{TH}$ position along the vertically extending logical columns between the horizontally extending logical rows. Alternatively, one of the second set of in-plane cross connects 318 could be relocated to a position between tracks of a horizontally extending logical row; however, in order to do so, one of the first set of in-plane cross connects (e.g., 314) would need to be removed to provide a free position.

The 2-D periodic array of diamond shaped areas 304, the first set of in-plane cross connects 314, the set of in-plane series connections 316, and the second set of in-plane cross connects 318 are suitably all formed from a common material, disposed in a common plane, and are suitably formed in a common manufacturing process. For example ITO may be used and patterned by etching or in a liftoff process. The first branched feed trace 309 and the second branched feed trace 313 and other feed traces (not numbered) as well as the first terminal 508 and the second terminal 516 and other terminals (not numbered) are optionally also formed from the aforementioned common material and disposed in the aforementioned common plane. Producing the aforementioned elements in a common layer, made in a common manufacturing step, fosters high yield and reliability of the electrical connections of the aforementioned elements. If the first branched feed trace 309 and the second branched feed trace 313 are formed in the common plane then they each effectively also serve as one in-plane cross connect between tracks. The first branched feed trace 309 and the second branched feed trace, as well as other branched feed traces may, in the interest of reducing ohmic losses, be made from high conductivity non-transparent materials such as silver adhesive ink.

FIGS. 3-4 show that end portions 320 of the second branched feed (or sense) line 313 that connect to the first column 310 and the second column 312 of diamond shaped areas (and other branched sense end portions, not numbered), and in-plane series connections 316 of the first column 310 and second column 312 (as well as of other columns, not numbered) are covered by patches of insulator material 422 (only six of which are numbered to avoid crowding the drawing). The patches of insulator material 422 can for example include a thermoset epoxy ink or an ultraviolet (UV) curable acrylic ink. The insulator material 422 may include a dielectric filler such as SiOx, Al2O3, CaO, MgO, TiO. Other additives as known in the art such as photoinitiators, surfactant, or viscosity control agents may also be included in the insulator material 422 and may be formed by printing, blanked deposition followed by imagewise etching, or using a lift-off process.

FIG. 5 shows a set of conductive bridges 524 connect adjacent diamond shaped areas in the first row of diamond shaped areas 306 and in the second row of diamond shaped areas 308 (as well as in other rows of diamond shaped areas not specifically numbered). Each of the set of conductive bridges 524 extend from one diamond shaped area to a horizontally adjacent diamond shaped area passing over one of the patches of insulator material 422 that is disposed between the horizontally adjacent diamond shaped areas, e.g., 306, 308. The set of conductive bridges 524 are disposed above the plane occupied by the periodic array of diamond shaped areas 304. End portions 526 of the conductive bridges 524 make contact with the diamond shaped areas, e.g., 306, 308. Medial portions 528 of the conductive bridges 524 overlie the patches of insulator material 422.

A broad class of touch screens include horizontal and vertical logical lines that cross each other. As in the embodiment shown in FIGS. 3-5 conductive bridges 524 are used at crossing points to avoid electrical shorts. The conductive bridges 524 introduce manufacturing complexity beyond the complexity of the in-plane patterns. The conductive bridges 524 also introduce failure modes which are described by a certain finite failure probability. The particular design shown in FIGS. 3-5 addresses the possibility of failure of the conductive bridges 524 in a manner that mitigates the increased risk of failure associated with the conductive bridges 524.

In the design shown in FIGS. 3-5 conductive bridges 524 are used to achieve electrical continuity in the horizontal tracks 502, 504 of the horizontally extending logical line 506 (and others). Within the horizontal tracks 502, 504 signals must pass between successive diamond shaped areas 306, 308 via the conductive bridges 524. To mitigate against the risk of an open circuit failure in the conductive bridges 524, each pair of adjacent diamond shaped areas of the horizontal tracks 502, 504 are connected by an in-plane cross connect 314. Accordingly an in-plane cross connect 314 is located adjacent each conductive bridge 524 and also located between each successive pair of conductive bridges 524. In the event of an open circuit failure of one or more of the conductive bridges 524, signals can flow through the in-plane cross connects 314 thus bypassing the open circuit failure.

In order for signals in a horizontal logical line to be stopped, a pair of adjacent conductive bridges 524 would need to fail. The probability of an open circuit failure of even a single conductive bridge 524 is small though not negligible. However the probability of two adjacent open circuit failures being the product of the small probability of a single failure is substantially smaller. Thus providing in-plane cross connects 314 before (in the sense of signal flow direction) each set of conductive bridges 524 mitigates against failure of the touch sensor panel shown in FIGS. 3-5 due to failures of a conductive bridge 524.

In so far as the diamond shaped areas 310, 312 of the vertical tracks 510, 512 of the vertically extending logical column 514 are connected by in-plane series connections 316 as opposed to conductive bridges 524 there is a lower probability of failure of electrical continuity in the vertical tracks 510, 512 and in a statistical sense comparatively less benefit in allocating possible positions in the electrode array 206 for cross connects for the vertical tracks 510, 512. In the embodiments shown in FIGS. 3-5 there are in fact fewer in-plane cross connects connecting the vertical tracks 510, 512.I In particular every other pair of diamond shaped areas in the vertical tracks 510, 512 is connected by in-plane cross connects 318. Thus by design the embodiment shown in FIGS. 3-5 prioritizes the placement of in-plane cross connects 314, 318 where they are most likely to have the most beneficial impact on the touch sensor panel's 104 ability to function.

Figure 6:
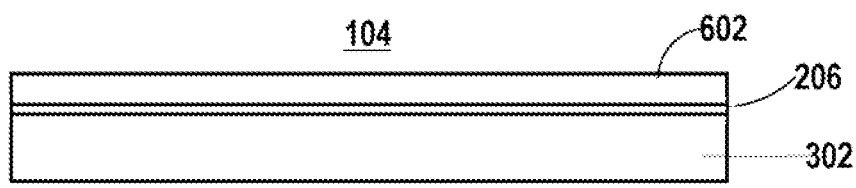
FIG. 6 is a schematic cross sectional view of the touch sensor panel shown in FIGS. 3-5 according to an embodiment.

FIG. 6 is a schematic cross sectional view of the touch sensor panel 104 shown in FIGS. 3-5 according to an embodiment. The electrode array 206 is shown disposed on the support 302. A protective layer 602 is shown overlying the electrode array 206.

Figure 7:
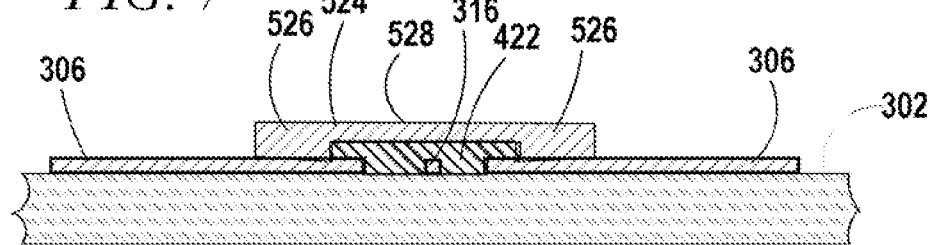
FIG. 7 is a fragmentary cross sectional view of a portion of the touch sensor panel shown in FIGS. 3-6 at a point where two conductive tracks cross.

FIG. 7 is a fragmentary cross sectional view of a portion of the touch sensor panel shown in FIGS. 3-6 at a point where two conductive tracks cross. An adjacent pair of the first row of diamond shaped areas 306 is shown. One of the set of in-plane series connections 316 that vertically connects the first column of diamond shaped areas 310 is shown passing between the adjacent pair of first row diamond shaped areas 306. One of the patches of insulator material 422 overlies the in-plane series connection 316 shown and one of the conductive bridges 524 extends between the adjacent pair of the first row of diamond shaped areas 306, passing over the patch of insulator material 422 that is shown.

Figure 8:
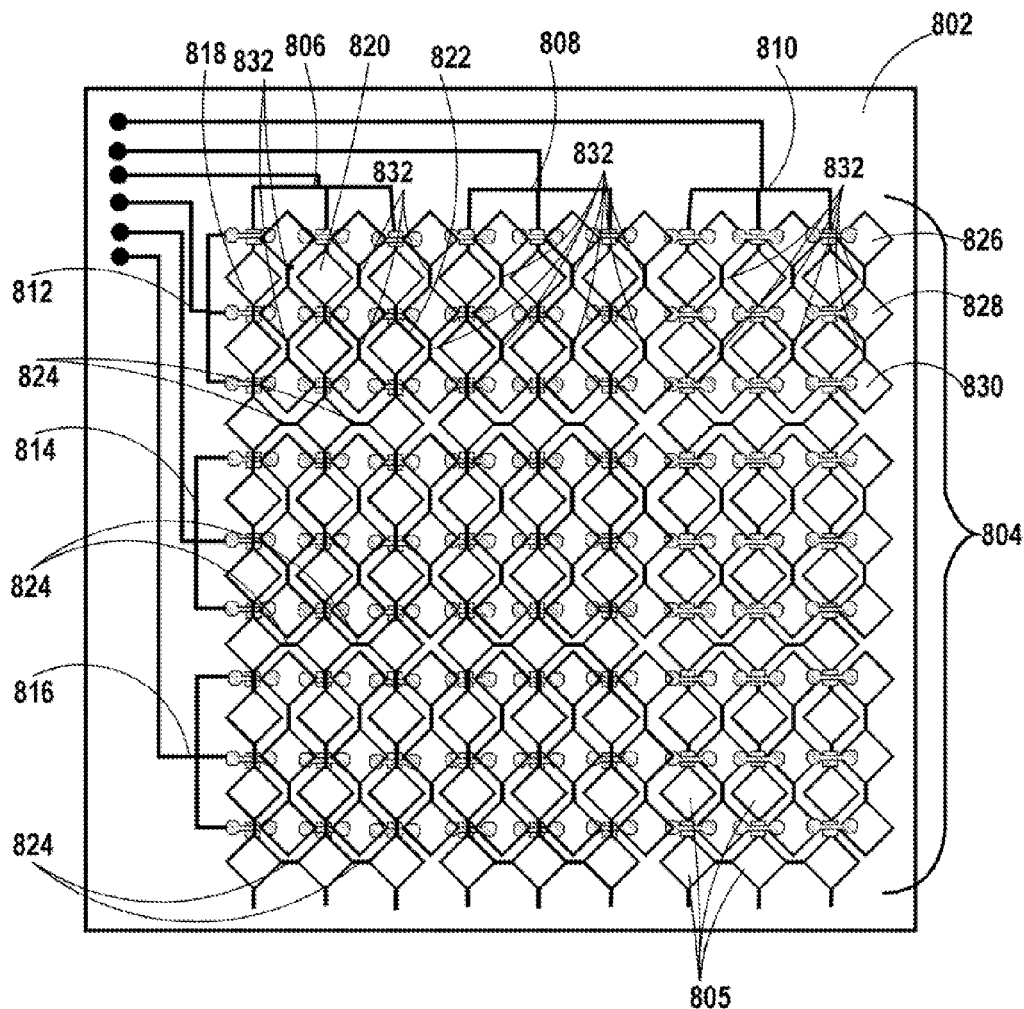
FIG. 8 is a plan view of an electrode array of a touch sensor panel according to an embodiment that includes triple tracks for each logical line.

FIG. 8 is a plan view of a touch sensor panel 802 that has an electrode array 804 according to an embodiment including a 2-D periodic array of diamond shaped areas 805 and that includes triple tracks for each logical line. The pattern of the electrode array 804 has a pattern analogous to the embodiment shown in FIGS. 3-5 however in the case of the electrode array 804 each logical line includes three tracks rather than two tracks. The electrode array 804 includes a first vertically extending logical line 806, a second vertically extending logical line 808, and a third vertically extending logical line 810 which are used to measure a horizontal coordinate of a user's touch. The electrode array 804 also includes a first horizontally extending logical line 812, a second horizontally extending logical line 814, and a third horizontally extending logical line 816 which are used to measure a vertical coordinate of a user's touch.

By way of example, the first vertically extending logical line 806 includes a first conductive track 818, a second conductive track 820, and a third conductive track 822 which are connected by horizontally extending in-plane cross connects 824. The in-plane cross connects 824 are located between the horizontally extending logical lines 812, 814, 816. Also by way of example, the first horizontally extending logical line 812 includes a fourth conductive track 826, a fifth conductive track 828, and a sixth conductive track 830. Each set of three vertically aligned diamond shaped areas 805 in each horizontally extending logical line are connected by vertically extending in-plane cross connects 832.

The inclusion of in-plane cross connects provide backup signal pathways in case there is open circuit failure in one or more tracks in a logical line. The presence of the in-plane cross connects greatly reduces the probability that an open circuit failure will lead to a non-working touch sensor panel. Providing three horizontal tracks 826, 828, 830 per horizontally extending logical line 812 and providing in-plane cross connects 832 to connect together each set of adjacent diamond shaped areas 805 of the three horizontal tracks 826, 828, 830 has the benefit that it greatly decreases the probability that signal flow in a horizontally extending logical line 812, 814, 816 can be completely stopped because in order to do so three adjacent conductive bridges in a horizontally extending logical line 812, 814, 816 would need to fail. If fewer than three adjacent conductive bridges failed, signals would simply bypass the failed conductive bridges by way of the in-plane cross connects 832. The probability of three adjacent bridges failing is the probability of a single bridge failure cubed which is an even smaller probability than the probability, considered in the context of FIGS. 3-5, of two adjacent bridges failing. According to certain embodiments, at least one logical line of a touch panel sensor includes three or more tracks which are cross connected by in-plane cross connects (e.g., 832).

Figure 9:
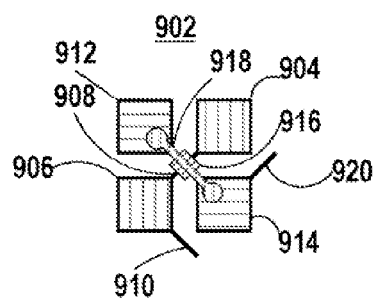
FIG. 9 is a plan view of a unit cell of an electrode array of a touch sensor panel according to an embodiment that includes square electrodes that have edges aligned with Cartesian axes of the touch sensor panel.

FIG. 9 is a plan view of a unit cell 902 of a 2-D periodic electrode array 1002 (FIG. 10) of a touch sensor panel 1004 according to an embodiment that includes square electrodes 904, 906, 912, 914 that have edges aligned with Cartesian axes of the touch sensor panel 1004. The unit cell 902 includes a first square electrode 904 and a second square electrode 906 that are offset vertically and horizontally from each other such that a virtual line angled at 45 degrees passes through centers of the first square electrode 904 and the second square electrode 906. The first square electrode 904 is located at an upper-right position of the unit cell 902 and the second square electrode 906 is located at a lower-left position of the unit cell 902. The first square electrode 904 and the second square electrode 906 are connected by a first in-plane series connection (trace) 908. A second in-plane series connection 910 extends down and to the right at a 45 degree angle from the lower right hand corner of the second square electrode 906. Within the larger electrode array 1002, vertically displaced repetitions of the unit cell 902 create a set of vertically extending conductive tracks 1006 from the first square electrode 904, second square electrode 906, first in-plane connection 908, and second in-plane connection 910. In such a repeated pattern the second in-plane connection 910 will connect to the upper-left corner of the first square electrode 904 of another like unit cell 902 positioned below the unit cell from which the second in-plane connection 910 extends.

A third square electrode 912 of the unit cell 902 is located in an upper-left hand corner of the unit cell 902 and a fourth square electrode 914 of the unit cell 902 is located in a lower-right hand corner of the unit cell 902. A patch of insulator material 916 is centrally located in the unit cell 902 between the square electrodes 904, 906, 912, 914 covering the first in-plane series connection 908. A conductive bridge 918 extends from the lower right corner of the third square electrode 912 over the patch of insulator material 916 to the upper left corner of the fourth square electrode 914. A third in-plane connection 920 extends from the upper right corner of the fourth square electrode 914 upward and to the right at a 45 degree angle. Within the larger electrode array 1002 horizontally displaced repetitions of the unit cell 902 will create a horizontally extending conductive track 1008 from the third square electrode 912, the conductive bridge 918, the fourth square electrode 914, and the third in-plane connection 920. In such an arrangement the third in-plane connection 920 will connect to the lower-left corner of the third square electrode 912 of a successive unit cell 902.

Figure 10:
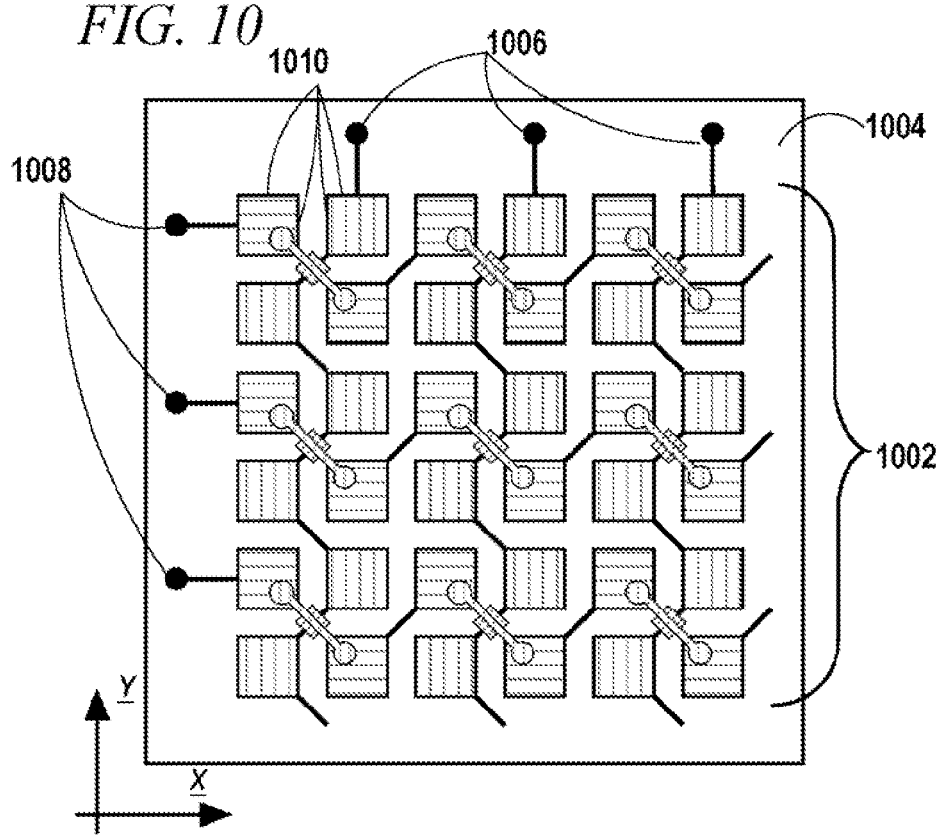
FIG. 10 is a plan view of a touch sensor panel based on the unit cell shown in FIG. 9.

In the full electrode array 1002, the aforementioned vertically extending conductive tracks 1006 and horizontally extending conductive tracks 1008 crisscross the electrode array 1002 as shown in FIG. 10. Note that the aforementioned vertically extending tracks 1006 follow a zigzag (angular serpentine) path through successive instances of the first square electrode 904 and the second square electrode 906 of the unit cell 902 (FIG. 9). Similarly the aforementioned horizontally extending tracks 1008 follow a zigzag (angular serpentine) path through successive instances of the third square electrode 912 and the fourth square electrode 914 of the unit cell 902 (FIG. 9). Thus, although the paths zigzag on a small scale, the paths are generally vertical or horizontal on a large scale.

The electrodes 904, 906 that form vertically extending tracks 1006 are members of a first subset (plurality) of electrodes in the electrode array 1002, and electrodes 912, 914 that form horizontally extending tracks 1008 are members of a second subset (plurality) of electrodes in the electrode array 1002. In FIG. 9 and FIG. 10, electrodes in the first subset are marked with a vertical cross hatch and electrodes in the second subset are marked with a horizontal cross hatch. The arrangement of square electrodes 904, 906, 912, 914 in the electrode array 1002 is such that, when proceeding along either vertical or horizontal lines, each successive position alternates between being occupied by an electrode of the first subset and an electrode of the second subset.

The vertically extending conductive tracks 1006 are spaced apart horizontally and as such are arranged to measure the horizontal (X) coordinate, whereas the horizontally extending tracks 1008 are spaced apart vertically and as such are arranged to measure the vertical (Y) coordinate. Note the electrodes 904, 906, 912, 914 of the electrode array 1002 include edges 1010 that are parallel and perpendicular to the directions (X, Y) along which the horizontal and vertical coordinate are measured. The X and Y coordinate axes are shown in FIG. 10.

A signal driver may be coupled to the horizontally extending tracks 1008 and a signal sensor may be coupled to the vertically extending tracks 1006. Alternatively the coupling of the signal driver and signal sensor may be reversed.

Figure 11:
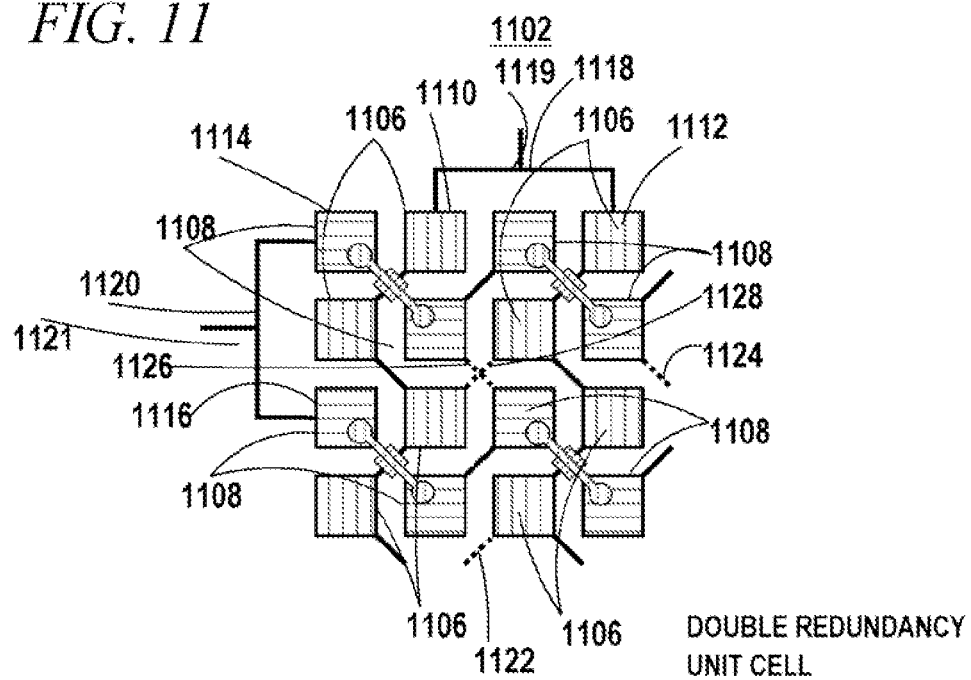
FIG. 11 is a plan view of a unit cell of an electrode array of a touch sensor panel according to an embodiment that includes square electrodes that have edges aligned with Cartesian axes of the touch sensor panel and in which each logical line includes two parallel tracks.
Figure 12:
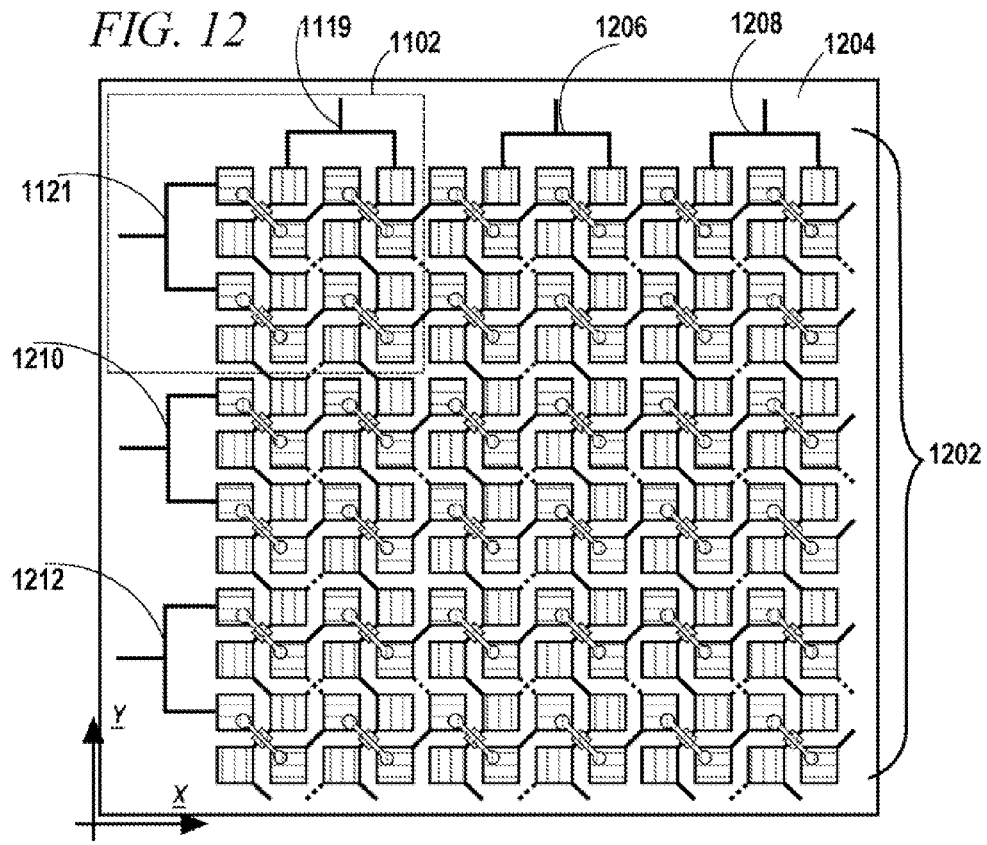
FIG. 12 is a plan view of a touch sensor panel based on the unit cell shown in FIG. 12.

FIG. 11 is a plan view of a unit cell 1102 of an electrode array 1202 (FIG. 12) of a touch sensor panel 1204 (FIG. 12) that includes square electrodes 1106, 1108 that have edges aligned with Cartesian axes of the touch sensor panel 1204 and in which each logical line includes two parallel tracks. A first subset of electrodes 1106 of the unit cell 1102 form vertically extending tracks 1110, 1112 including a first vertical track 1110 and a second vertical track 1112. A second subset of electrodes 1108 of the unit cell 1102 form horizontally extending tracks 1114, 1116 including a first horizontal track 1114 and a second horizontal track 1116. A difference between the embodiment shown in FIGS. 9, 10 and the embodiment shown in FIGS. 11, 12 is that in the latter embodiment, pairs of adjacent tracks are connected together in logical lines. As shown in FIG. 11 the first vertical track 1110 and the second vertical track 1112 are connected to a common first branched feed line 1118 and thereby connect together as a first vertical logical line 1119. Similarly the first horizontal track 1114 and the second horizontal track 1116 are connected to a common second branched feed line 1120 and thereby connect together as a first horizontal logical line 1121. While the branched feed lines 1118, 1120 are shown in FIG. 11 and are present along the top and left side edges of the electrode array 1202 as shown in FIG. 12, they are not required for certain other repetitions of the unit cell 1102, e.g., repetitions in the interior of the electrode array 1202 and along the bottom and right edges.

Four added cross connects 1122, 1124, 1126, 1128 are shown in FIG. 11. The added cross connects 1122, 1124, 1126, 1128 are represented by dashed lines. A first added cross connect 1122 extends to the left and down from the lower left hand corner of the bottom electrode of the second vertical track 1112. In the larger electrode array 1202 the first added cross connect 1122 would connect to an electrode of the first vertical track 1110 present in a copy of the unit cell 1102 located below the unit cell from which the added cross connect 1122 extends, e.g., the unit cell 1102 shown in FIG. 11. Thus, the first cross connect 1122 connects the first vertical track 1110 and the second vertical track 1112, thereby providing a bypass signal pathway around certain potential open circuit failures in either the first vertical track 1110 or the second vertical track 1112. Other added cross connects discussed below fulfill a similar purpose.

A second added cross connect 1124 extends down and to the right from the right most electrode of the first horizontal track 1114. The second added cross connect 1124 would connect to an electrode of the second horizontal track 1116 of a successive unit cell, thus connecting the first horizontal track 1114 and the second horizontal track 1116. The first added cross connect 1122 and the second added cross connect 1124 are suitably formed as in-plane traces formed from the same material and in the same process as the square electrodes 1106, 1108.

A third added cross connect 1126 and a fourth added cross connect 1128 cross each other at the center of the unit cell 1102. If both are present, one can be formed as an in-plane trace and one implemented using a bridge such as shown in FIG. 7. If only one is present, it can be implemented as an in-plane trace. The third added cross connect 1126 extends from the lower-right corner of the second (from the left) electrode of the first horizontal track 1114 to the upper-left corner of the third (from the left) electrode of the second horizontal track 1116. The fourth added cross connect 1128 extends from the lower-left corner of second (from the top) electrode of the second vertical track 1112 to the upper-right corner of third (from the top) electrode of the first vertical track 1110.

Referring to FIG. 12, the electrode array 1202 is made up of nine copies of the unit cell 1102. In addition to the first vertical logical line 1119, the electrode array 1202 includes a second vertical logical line 1206, and a third vertical logical line 1208. In addition to the first horizontal logical line 1121, the electrode array 1202 includes a second horizontal logical line 1210 and a third horizontal logical line 1212. What is shown in FIG. 12 is an illustrative example. In practice the electrode array 1202 can have more than three vertical and horizontal logical lines in order to determine touch position with more precision or to determine touch position on a larger panel.

Figure 13:
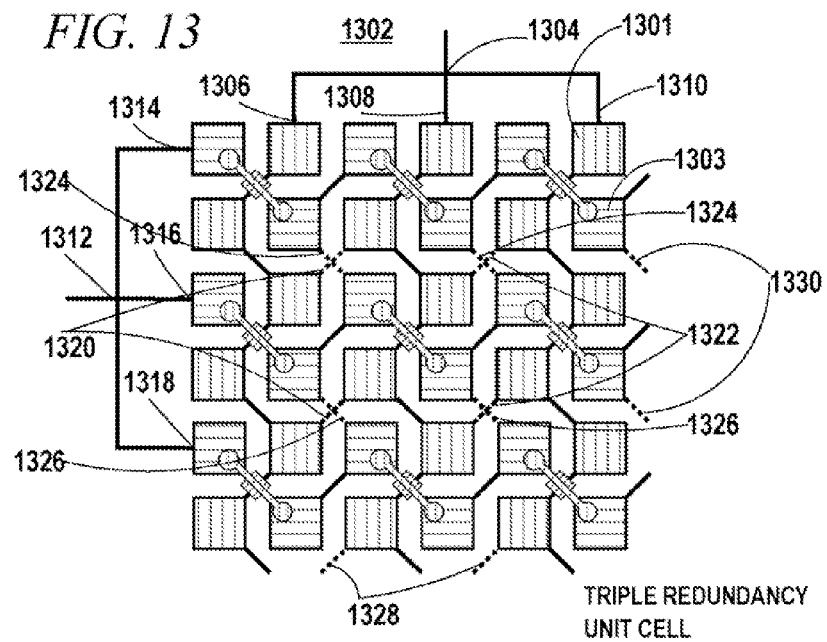
FIG. 13 is a plan view of a unit cell of an electrode array of a touch sensor panel according to an embodiment that includes square electrodes that have edges aligned with Cartesian axes of the touch sensor panel and in which each logical line includes three parallel tracks.

FIG. 13 is a plan view of a unit cell 1302 of an electrode array 1402 (FIG. 14) of a touch sensor panel 1404 (FIG. 14) that includes square electrodes 1301, 1303 that have edges aligned with Cartesian axes of the touch sensor panel. Whereas, in the embodiment shown in FIGS. 11, 12 each logical line includes two parallel tracks, in the embodiment shown in FIGS. 13, 14 each logical line includes three parallel tracks. A first vertical logical line 1304 includes a first vertical track 1306, a second vertical track 1308, and a third vertical track 1310. A first horizontal logical line 1312 includes a first horizontal track 1314, a second horizontal track 1316 and a third horizontal track 1318. Whereas the unit cell shown in FIG. 11 includes one pair of added crossed cross connects 1126, 1128 at the center of the unit cell 1102, the unit cell 1302 includes four pairs of added cross connects 1320, 1322, 1324, 1326 placed symmetrically around the center of the unit cell 1302. The four pairs of added cross connects 1320, 1322, 1324, 1326 are spaced from the center of the unit cell 1302 by displacements along the diagonals of four electrodes that surround the center.

A first pair of added cross connects 1320 connects the first vertical track 1306 and the second vertical track 1308. A second pair of added cross connects 1322 connects the second vertical track 1308 and the third vertical track 1310. A third pair of added cross connects 1324 connect the first horizontal track 1314 and the second horizontal track 1316. A fourth pair of added cross connects 1326 connects the second horizontal track 1316 and the third horizontal track 1318.

Whereas the unit cell 1102 included just the first added cross connect 1122 along its lower edge, the unit cell 1302 includes a fifth pair of added cross connects 1328 along its lower edge. The fifth pair of added cross connects 1328 connect the vertical tracks 1306, 1308, 1310 through repetitions of the unit cell 1302. Whereas the unit cell 1102 included just the second added cross connect 1124 along its right side, the unit cell 1302 includes a sixth pair of added cross connects 1330 along its right side. The sixth pair of added cross connects 1330 connects the horizontal tracks 1314, 1316, 1318 through repetitions of the unit cell 1302. The fifth pair of added cross connects 1328 and the sixth pair of added cross connects 1330 are suitably formed as in-plane cross connects.

The placement of the one pair of added crossed cross connects 1126, 1128 at the center of the unit cell 1102 in FIG. 11 and the placement of the four pairs of added cross connects 1320, 1322, 1324, 1326 in unit cell 1302 are alike in that in both cases the added cross connects 1126, 1128, 1320, 1322, 1324, 1326 are placed at positions within their respective unit cells 1102, 1302 that are between adjacent horizontal tracks of a single logical line and between adjacent vertical tracks of a single logical line. Other positions within the unit cells are either within the transverse extent of vertical tracks or within the transverse extent of horizontal tracks. Because the tracks zigzag between two adjacent lines (columns or rows) of the electrode array 1402 the transverse extent spans two electrodes. Alternatively, additional cross connects connecting parallel tracks could be added within the transverse extent of either the vertical tracks or horizontal tracks.

Figure 14:
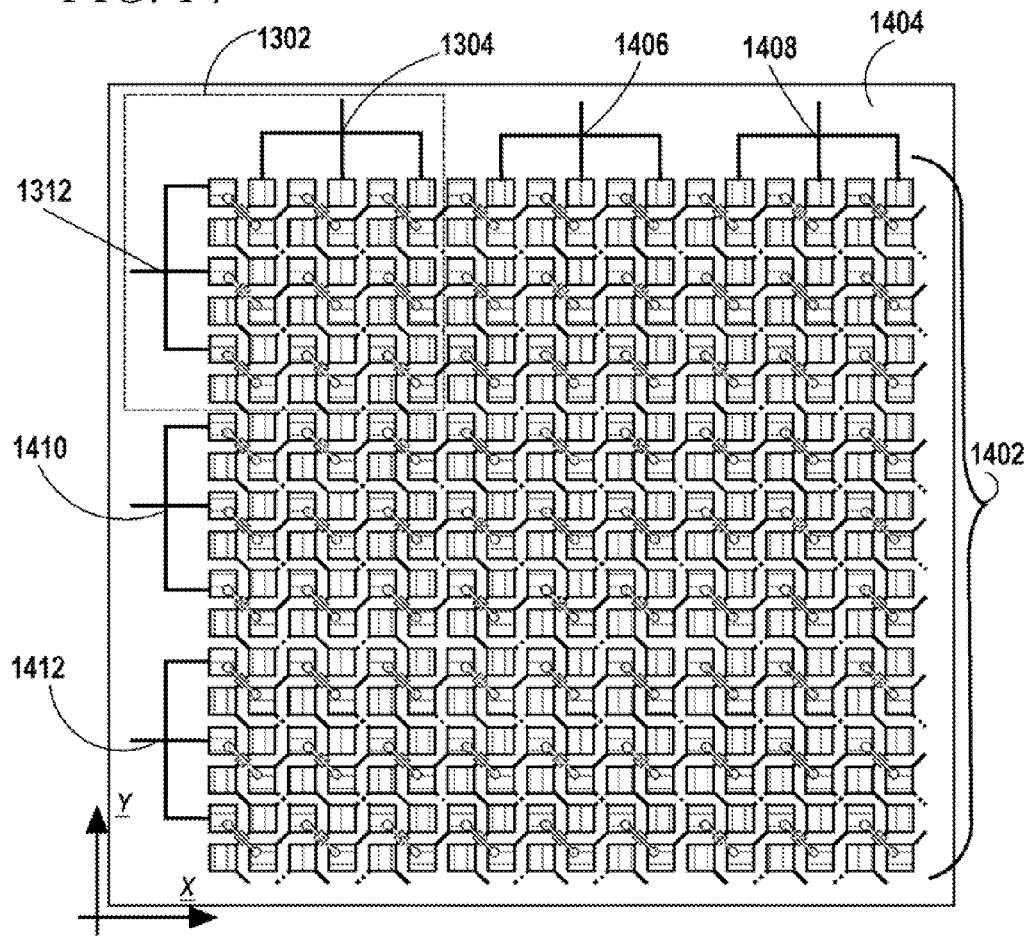
FIG. 14 is a plan view of a touch sensor panel based on the unit cell shown in FIG. 13.

As shown in FIG. 14 in addition to the first vertical logical line 1304 the electrode array 1402 includes a second vertical logical line 1406 and a third vertical logical line 1408. In addition to the first horizontal logical line 1312, the electrode array 1402 includes a second horizontal logical line 1410 and a third horizontal logical line 1412. What is shown in FIG. 14 is an illustrative example. In practice the electrode array 1402 can have more than three vertical and horizontal logical lines in order to determine touch position with more precision or to determine touch position on a larger panel.

The number of tracks in each logical row or logical column does not have to be the same. Although FIGS. 3-5 and FIGS. 11-12 show double-redundancy logical rows and logical columns, and FIGS. 8 and 13-14 show triple redundancy logical rows and logical columns, the level of redundancy does not have to be the same for logical rows as for logical columns.

Figure 15:
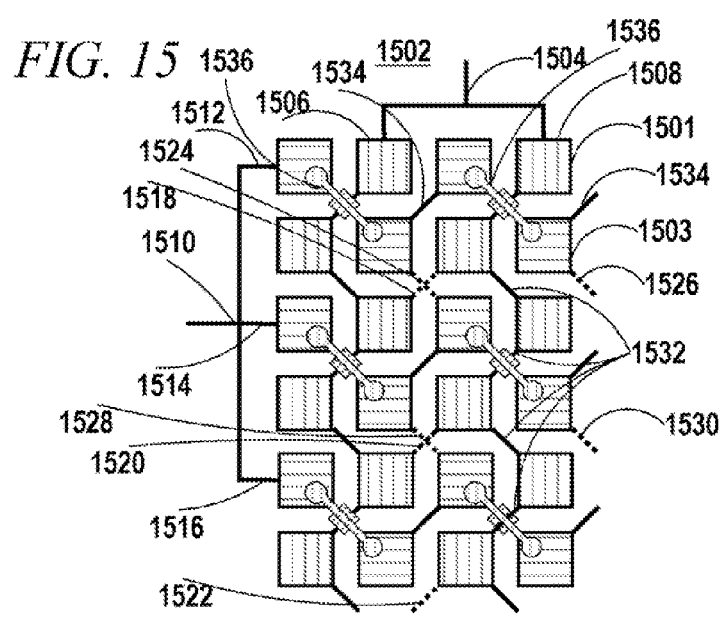
FIG. 15 is a plan view of a unit cell of an electrode array of a touch sensor panel according to an embodiment that includes square electrodes that have edges aligned with Cartesian axes of the touch sensor panel and in which each vertically extending logical line (for measuring a horizontal coordinate) includes two parallel tracks and each horizontally extending logical line (for measuring a vertical coordinate) includes three parallel tracks.

FIG. 15 is a plan view of a unit cell 1502 of an electrode array 1602 (FIG. 16) of a touch sensor panel 1604 (FIG. 16) that includes a first set of square electrodes 1501 and a second set of square electrodes 1503 that both have edges aligned with Cartesian axes of the touch sensor panel 1604 and in which each vertically extending logical line (for measuring a horizontal coordinate) includes two parallel tracks and each horizontally extending logical line (for measuring a vertical coordinate) includes three parallel tracks. Referring to FIG. 15, there is shown a first vertically extending logical line 1504 that includes a first vertical track 1506 and a second vertical track 1508. A first horizontally extending logical line 1510 includes a first horizontal track 1512, a second horizontal track 1514, and a third horizontal track 1516.

The first vertical track 1506 and the second vertical track 1508 are connected by a first cross connect 1518, a second cross connect 1520 and a third cross connect 1522. The first horizontal 1512 and the second horizontal track 1514 are connected by a fourth cross connect 1524 and a fifth cross connect 1526. The second horizontal track 1514 and the third horizontal track 1516 are connected by a sixth cross connect 1528 and a seventh cross connect 1530. The first cross connect 1518 and the fourth cross connect 1524 cross each other. One of the first 1518 and fourth 1524 cross connects can be made an in-plane cross connect and the other can be implemented as a bridge connection such as shown in FIG. 7. Alternately, only one cross connection (1518 or 1524) may be present, and it can be implemented as an in-place trace. An analogous situation exists with respect to the second cross connect 1520 and the sixth cross connect 1528 and can be handled in the same manner with one implemented as an in-plane cross connect and the other implemented as a bridge connection such as shown in FIG. 7. Alternately, only one cross connection (1520 or 1528) may be present, and it can be implemented as an in-place trace.

In the embodiment shown in FIG. 15, as in the embodiments shown in FIG. 11 and FIG. 13 there are cross connects 1518, 1520, 1524, 1528 between tracks 1506, 1508, 1512, 1514, 1516 of the same logical lines 1504, 1510 within the unit cell 1502 and there are cross connects 1522, 1526, 1530 between tracks 1506, 1508, 1512, 1514, 1516 of the same logical lines 1504, 1510 at the boundaries of the unit cell 1502.

The first vertically extending logical line 1504 includes the set of square electrodes 1501 and the first horizontally extending logical line 1510 includes the second set of square electrodes 1503. Analogous to the embodiments shown in FIGS. 11, 13, in the embodiment shown in FIG. 15 the first set of square electrodes 1501 of the vertical tracks 1506, 1508 connect through in-plane series connections (traces) 1532 (a limited number of which are labeled to avoid crowding the drawing) while the second set of square electrodes 1503 of the horizontal tracks 1512, 1514, 1516 connect through in-plane connections 1534 and bridge connections 1536 which alternate along the horizontal tracks such that every other connection is one of the in-plane connections 1534 and every other connection is one of the bridge connections 1536. (A limited number of the in-plane connections 1534 and the bridge connections 1536 are labeled to avoid crowding the drawing.

Figure 16:
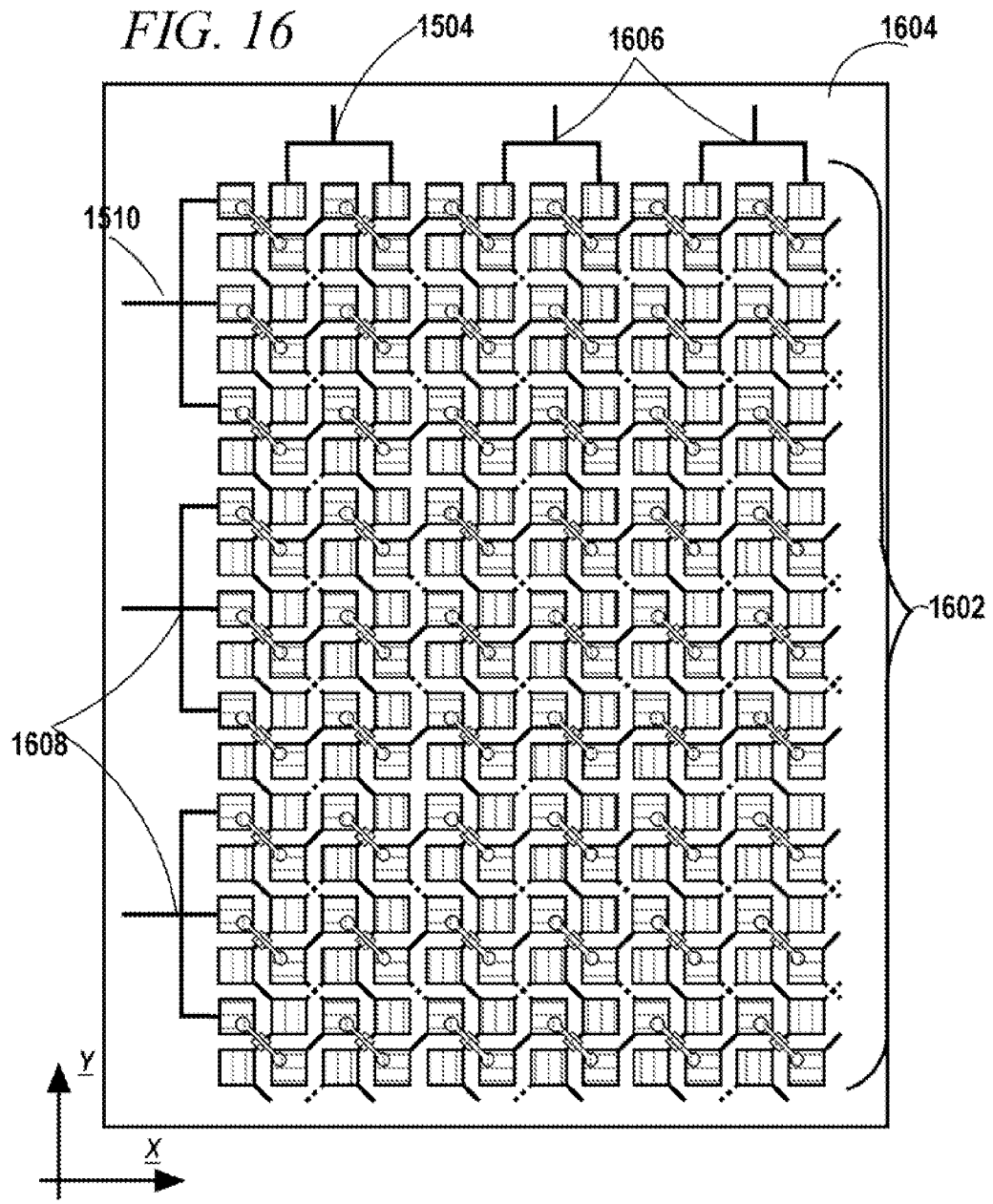
FIG. 16 is a plan view of a touch sensor panel based on the unit cell shown in FIG. 15.

FIG. 16 is a plan view of a touch sensor panel 1604 based on the unit cell 1502 shown in FIG. 15. As shown in FIG. 16 the electrode array 1602 also includes additional vertically extending logical lines 1606 and additional horizontally extending logical lines 1608. What is shown in FIG. 16 is an illustrative example. In practice the electrode array 1602 can have more than three vertical and horizontal logical lines in order to determine touch position with more precision or to determine touch position on a larger panel.

The embodiments shown in FIGS. 9-16 and described above include square electrodes. More generally the electrodes may be rectangular in shape.

Figure 17:
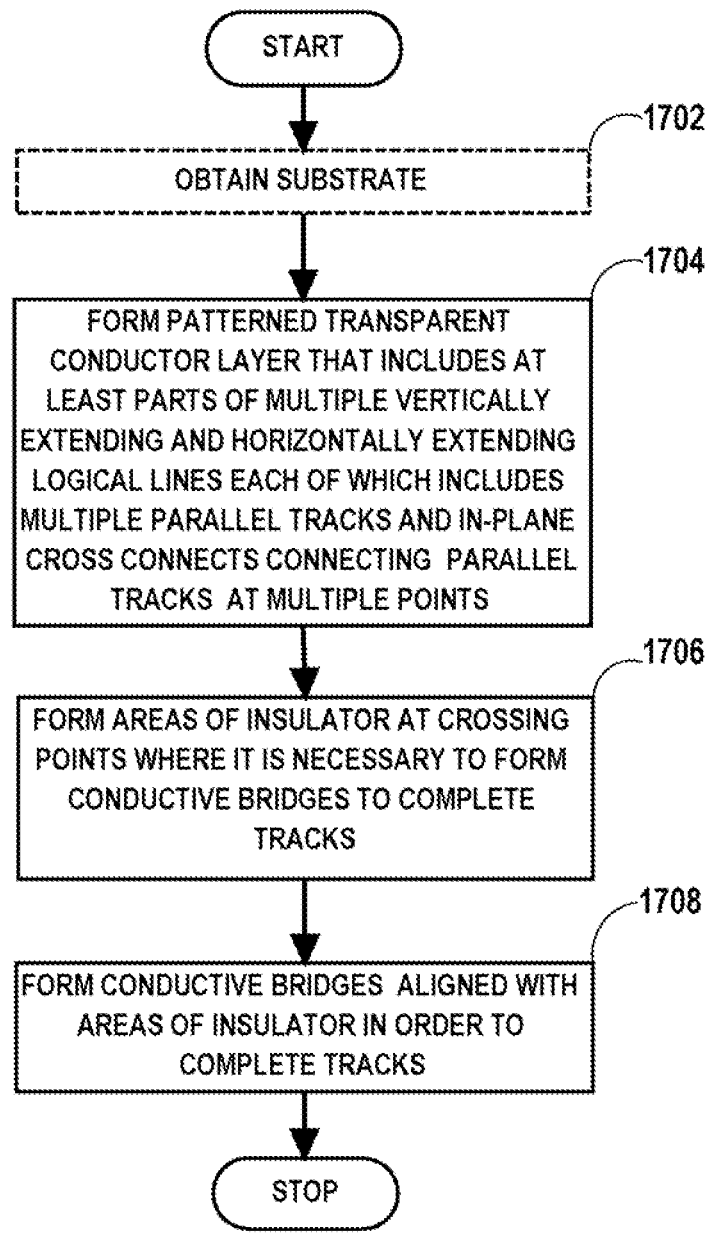
FIG. 17 is a flowchart of method of forming a touch sensor panel according to an embodiment.

FIG. 17 is a flowchart of method of forming a touch sensor panel according to an embodiment. In block 1702 a substrate is obtained. In block 1704 a patterned transparent conductor layer that includes at least parts of multiple vertically extending and horizontally extending logical lines, each of which includes multiple parallel tracks and in-plane cross connects connecting the parallel tracks at multiple points, is formed on the surface of the substrate. According to certain aspects, the patterned transparent layer that is formed in block 1704 includes complete tracks running in a first direction (e.g., vertical tracks) and disjoint segments of tracks running in a second direction (e.g., horizontal tracks). This would be the case in forming the embodiments shown in FIGS. 3-16. The transparent conductor layer may be formed by blanket deposition followed by imagewise etching or using a lift-off process.

Figure 18:
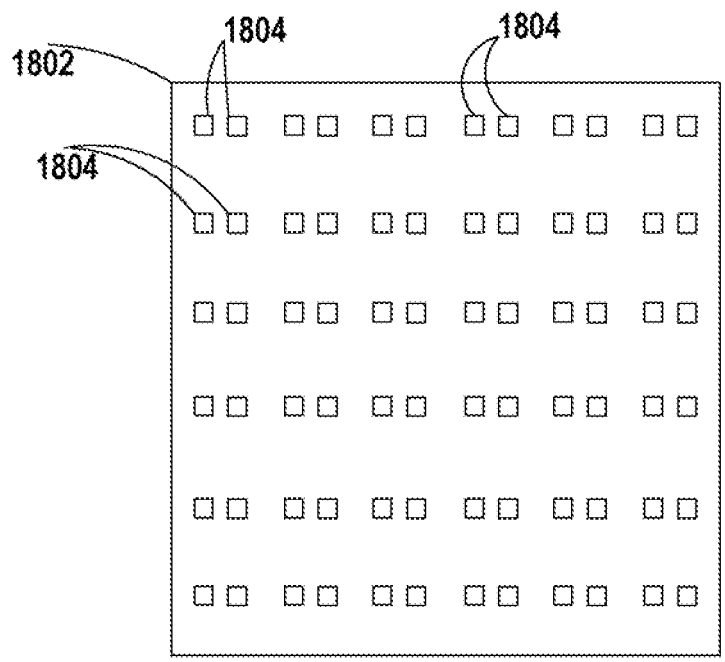
FIG. 18 is a patterned insulator layer for use in the touch sensor panel shown in FIGS. 3-5 according to an alternative embodiment of the invention.

In block 1706 areas of insulator are formed at (aligned with) crossing points where it is necessary to form conductive bridges to complete tracks (e.g., horizontal tracks). The areas of insulator may be formed by printing, blanket deposition followed by imagewise etching or using a lift-off process. Alternatively, rather than forming discrete areas of insulator, a layer of insulator having discrete openings through which electrical connections are made may be formed in block 1706. FIG. 18 shows an alternative layer of insulator 1802 having pairs of adjacent discrete openings 1804 (only a few of which are numbered to avoid crowding the drawing). End portions 526 of conductive bridges 524 can make contact with disjoint segments of tracks through the discrete openings 1804, and thereby connect the disjoint segments to form tracks.

In block 1708 conductive bridges are formed over the areas of insulator in order to complete tracks (e.g., horizontal tracks). The conductive bridges may be formed by printing, blanket deposition followed by imagewise etching or using a lift-off process.

With the sequence of operations as shown in FIG. 17, the process shown in FIG. 17 is in accord with an embodiment in which the touch sensor panel structure is built up on a substrate starting with the patterned transparent conductive layer that includes the tracks and interconnects and successively depositing the areas of insulator and the conductive bridges. Alternatively the structure can be inverted. In an inverted structure the conductive bridges are formed on a substrate, then a patterned insulator is deposited over the bridges, and then a patterned transparent conductive layer that includes logical lines is formed over the patterned insulator. To make such an alternative embodiment the order of 1704, 1706, 1708 will be reversed.

Figure 19:
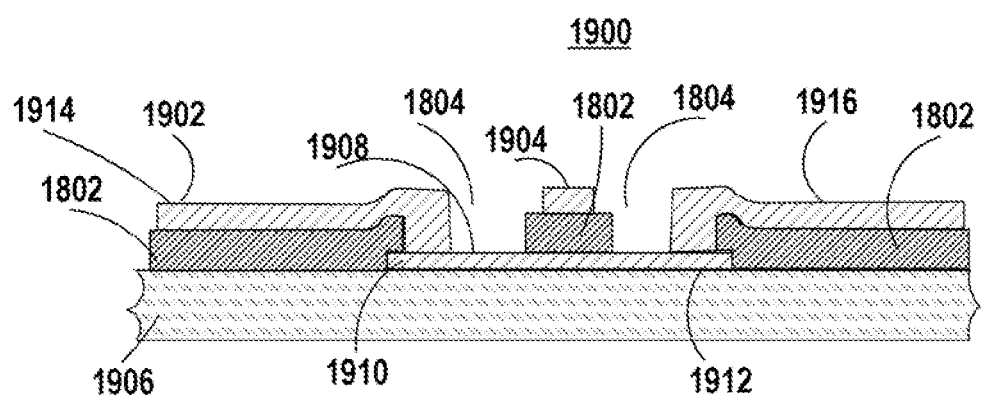
FIG. 19 is a fragmentary cross sectional view of a portion of a touch sensor panel with an "inverted" structure according to an embodiment of the invention.

FIG. 19 is a fragmentary cross sectional view of a portion of the touch sensor panel 1900 with an "inverted" structure according to an embodiment of the invention. FIG. 19 shows a portion of a touch sensor panel 1900 where a first track 1902 running in a first direction (e.g., horizontal) crosses a second track 1904 running in a second direction (e.g., vertical). In the cross sectional view of FIG. 19 the first direction would be horizontal and the second direction would be into and out of the plane of the drawing sheet.

The touch sensor panel 1900 includes a substrate 1906. A bridge conductor 1908 which serves in a conductive bridge is formed on the substrate 1906. The aforementioned layer of insulator 1802 is deposited on the substrate 1906. Two of the aforementioned openings 1804 in the layer of insulator 1802 are aligned with a first end portion 1910 and a second end portion 1912 of the bridge conductor 1908. A first track segment 1914 extends from the left (in the perspective of the drawing) over the layer of the insulator 1802 into the opening 1804 located on the left side and makes contact through the opening 1804 with the first end portion 1910 of the bridge conductor 1908. Similarly a second rack segment 1916 extends from the right (in the perspective of the drawing) over the layer of insulator 1802 into the opening 1804 located on the right and makes contact through the opening 1804 with the second end portion 1912 of the bridge conductor 1908. A portion of the second track 1904 which extends into and out of the plane of drawing is shown overlying a portion of the insulator layer 1804 that is located over the bridge conductor 1908 between the two openings 1804.

The patterns of transparent conductor, insulator areas, and conductive bridges that are formed in blocks 1704, 1706, 1708 can be any of the patterns shown in FIGS. 3-5, 8-16.

Figure 20:
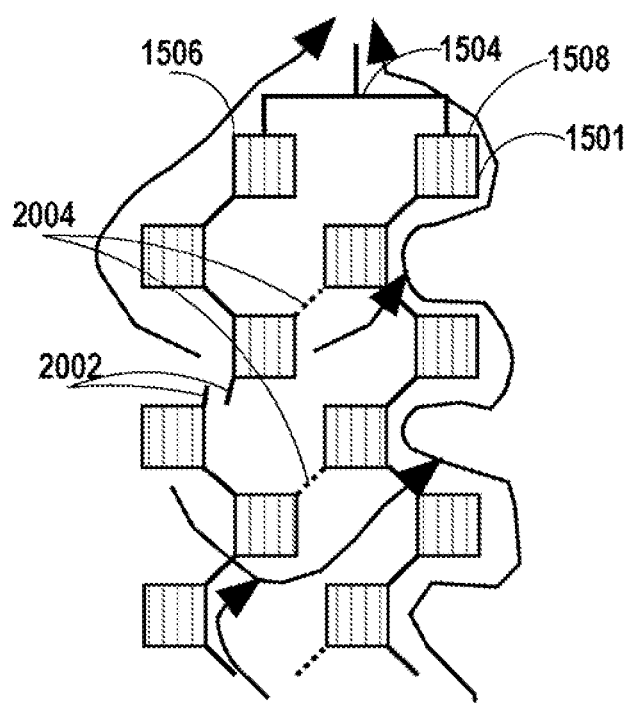
FIG. 20 shows a vertically extending logical line of the unit cell shown in FIG. 15 with an open circuit fault in one track of the logical line.

FIG. 20 shows the first vertically extending logical line 1504 of the unit cell 1502 shown in FIG. 15 with an open circuit fault 2002 in the first vertical track 1506. Owing to the existence of cross-connects 2004 which can be implemented as an in-plane cross connect or a bridge cross-connect, signals from all of the electrodes 1501 of the first vertical track 1506, even those below the open circuit fault 2002, are able to reach the top of the vertically extending logical line 1504. Signal pathways through the vertically extending logical lines are indicated by arrows in FIG. 20.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that various embodiments described herein may be comprised of one or more conventional processors and unique stored program instructions that control the one or more processors to implement, in conjunction with certain non-processor circuits, some, most, or all of the functions of the touch sensor panels described herein. The non-processor circuits may include, but are not limited to signal drivers, signal sensors, clock circuits and power source circuits. As such, these functions may be interpreted as steps of a method to perform receive user input. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, several embodiments have been described. However, one of ordinary skill in the art appreciates that various modifications and changes can be made without departing from the scope as set forth in the claims below. Accordingly, the specification and figures are to be regarded in an illustrative rather than a restrictive sense, and all such modifications are intended to be included within the scope of claims. The benefits, advantages, solutions to problems, and any element(s) that may cause any benefit, advantage, or solution to occur or become more pronounced are not to be construed as a critical, required, or essential features or elements of any or all the claims. The inventionis defined solely by the appended claims including any amendments made during the pendency of this application and all equivalents of those claims as issued.

We claim:

1. A touch sensor panel for sensing coordinates of a user's touch, the touch sensor panel comprising:
   a first plurality of logical lines for sensing a first coordinate, wherein each of the first plurality of logical lines includes:
      a first plurality of parallel adjacent tracks extending in a first direction, each track including electrodes connected in series, and
      a first plurality of in-plane cross connects connecting the first plurality of parallel adjacent tracks to provide redundant signal paths for each of the first plurality of logical lines,
      a first plurality of parallel adjacent tracks extending in a first direction, each track including electrodes connected in series, and
      wherein the first plurality of parallel adjacent tracks and the first plurality of in- plane cross connects are disposed in a common plane;
   a second plurality of logical lines for sensing a second coordinate, wherein each of the second plurality of logical lines includes:
      a second plurality of parallel adjacent tracks extending in a second direction perpendicular to the first direction, each track including electrodes connected in series, and
      a second plurality of in-plane cross connects connecting the second plurality of parallel adjacent tracks to provide redundant signal paths for each of the second plurality of logical lines
      wherein the second plurality of in-plane cross connects are disposed in the common plane.

2. The touch sensor panel according to claim 1 wherein there are no cross connects between the first plurality of parallel adjacent tracks that extend out of the common plane.

3. The touch sensor panel according to claim 2 wherein there are no cross connects between the second plurality of parallel adjacent tracks that extend out of the common plane.

4. The touch sensor panel according to claim 1 wherein the first plurality of in-plane cross connects are located between logical lines of the second plurality of logical lines.

5. The touch sensor panel according to claim 1 wherein the second plurality of parallel adjacent tracks crosses the first plurality of parallel adjacent tracks at a plurality of crossing points, and wherein at, at least a subset of the plurality of crossing points, the first plurality of parallel adjacent tracks includes a first conductive connection in the common plane and the second plurality of parallel adjacent tracks includes a second conductive connection that is at least partially displaced from the common plane and insulated from the first conductive connection by an insulating material.

6. The touch sensor panel according to claim 5 wherein one of said second plurality of in-plane cross connects is located adjacent to each second conductive connection.

7. The touch sensor panel according to claim 6 wherein the first plurality of parallel adjacent tracks includes the first conductive connection in the common plane and the second plurality of parallel adjacent tracks includes the second conductive connection that is at least partially displaced from the common plane and insulated from the first conductive connection by the insulating material at all of the plurality of crossing points.

8. The touch sensor panel according to claim 5 wherein one of said second plurality of in-plane cross connects connects to a point on one of said second plurality of parallel adjacent tracks between each pair of successive second conductive connections.

9. The touch sensor panel according to claim 5 wherein the second plurality of parallel adjacent tracks includes at least three parallel adjacent tracks.

10. The touch sensor panel according to claim 5 wherein the first plurality of parallel adjacent tracks includes a first plurality of diamond shaped areas disposed in the common plane and the second plurality of parallel adjacent tracks includes a second plurality of diamond shaped areas disposed in the common plane and wherein the first plurality of diamond shaped areas and the second plurality of diamond shaped areas are arranged interleaved in a 2-D periodic pattern.

11. The touch sensor panel according to claim 10 wherein the second plurality of parallel adjacent tracks each includes a first conductive track and a second conductive track and each diamond shaped area of the first conductive track is connected by one of the second plurality of in-plane cross connects to a diamond area of the second conductive track.

12. The touch sensor panel according to claim 11 wherein there is an integer number N tracks in the second plurality of parallel adjacent tracks and each of the first plurality of logical lines includes a third conductive track and a fourth conductive track and every NTH diamond shaped area of the third conductive track is connected by one of the first plurality of in-plane cross connects to a diamond area of the fourth conductive track.

13. The touch sensor panel according to claim 12 wherein at least a subset of the second plurality of logical lines extend between immediately adjacent pairs of the first plurality of in-plane cross connects that connect the third conductive track and the fourth conductive track.

14. The touch sensor panel according to claim 5 wherein the first plurality of parallel adjacent tracks includes a first plurality of rectangular electrodes disposed in the common plane and the second plurality of parallel adjacent tracks includes a second plurality of rectangular electrodes disposed in the common plane and wherein the first plurality of rectangular electrodes and the second plurality of rectangular electrodes are arranged interleaved in a 2-D rectangular array such that each of the first plurality of parallel adjacent tracks and each of the second plurality of parallel adjacent tracks follows a zigzag path through the 2-D rectangular array.

15. The touch sensor panel according to claim 14 wherein the first plurality of rectangular electrodes and the second plurality of rectangular electrodes are arranged in the 2-D rectangular array such that electrodes in the first plurality of rectangular electrodes alternate in position with electrodes in the second plurality of rectangular electrodes in both a first direction associated with the first coordinate and a second direction associated with the second coordinate, the first plurality of logical lines are spaced apart in the first direction and arranged so as to determine the first coordinate, the second plurality of logical lines are spaced apart in the second direction and arranged so as to determine the second coordinate, and the first plurality of rectangular electrodes and the second plurality of rectangular electrodes comprise edges that are parallel and perpendicular to the first direction and the second direction, wherein each of the first plurality of parallel adjacent tracks and each of the second plurality of parallel adjacent tracks includes a sequence of electrodes wherein successive electrodes in the sequence of electrodes alternate in position between two adjacent lines of electrodes in the 2-D rectangular array.

16. The touch sensor panel according to claim 14 wherein at least a subset of the first plurality of in-plane cross connects are located in positions between two of the first plurality of parallel adjacent tracks and between two of the second plurality of parallel adjacent tracks.

17. The touch sensor panel according to claim 14 wherein at least a subset of the second plurality of in-plane cross connects are located in positions between two of the first plurality of parallel adjacent tracks and between two of the second plurality of parallel adjacent tracks.

18. The touch sensor panel according to claim 14 wherein at least a subset of the first plurality of in-plane cross connects are located between logical lines of the second plurality of logical lines.

19. The touch sensor panel according to claim 14 wherein at least a subset of the second plurality of in-plane cross connects are located between logical lines of the first plurality of logical lines.

\* \* \* \* \*